(12) United States Patent
Guo et al.

(10) Patent No.: US 8,400,075 B2
(45) Date of Patent: Mar. 19, 2013

(54) ILLUMINATION CIRCUIT HAVING BYPASS CIRCUIT CONTROLLABLE ACCORDING TO VOLTAGE CHANGE OF SERIES CIRCUIT THEREOF

(75) Inventors: Wei Guo, Shenzhen (CN); Yaw-Shing Tseng, Miao-Li County (TW); Chu-Jung Shih, Miao-Li County (TW); Chen-Hsun Liao, Miao-Li County (TW)

(73) Assignee: Chimei Innolux Corporation (TW)

( * ) Notice: Subject to any disclaimer, the term of this patent is extended or adjusted under 35 U.S.C. 154(b) by 325 days.

(21) Appl. No.: 12/768,740

(22) Filed: Apr. 28, 2010

(65) Prior Publication Data
US 2011/0115405 A1 May 19, 2011

(30) Foreign Application Priority Data
Nov. 19, 2009 (CN) .......................... 2009 1 0310018

(51) Int. Cl.
*H05B 37/02* (2006.01)
*H05B 39/00* (2006.01)
(52) U.S. Cl. ........ 315/294; 315/120; 315/122; 315/125; 315/186
(58) Field of Classification Search .................. 315/120, 315/122, 125, 152, 153, 185 R, 186, 193, 315/294
See application file for complete search history.

(56) References Cited

U.S. PATENT DOCUMENTS

| 7,339,323 | B2* | 3/2008 | Bucur | 315/128 |
|---|---|---|---|---|
| 7,649,326 | B2* | 1/2010 | Johnson et al. | 315/291 |
| 7,710,050 | B2* | 5/2010 | Preston et al. | 315/312 |
| 7,723,926 | B2* | 5/2010 | Mednik et al. | 315/291 |
| 7,800,316 | B2* | 9/2010 | Haug | 315/299 |
| 7,986,107 | B2* | 7/2011 | Weaver et al. | 315/291 |
| 8,159,454 | B2* | 4/2012 | Radermacher et al. | 345/102 |
| 8,174,212 | B2* | 5/2012 | Tziony et al. | 315/309 |
| 8,188,679 | B2* | 5/2012 | Hoogzaad | 315/294 |
| 2007/0257623 | A1* | 11/2007 | Johnson et al. | 315/193 |
| 2010/0134041 | A1* | 6/2010 | Radermacher et al. | 315/294 |

FOREIGN PATENT DOCUMENTS

| CN | 2840586 Y | 11/2006 |
|---|---|---|
| CN | 101290104 A | 10/2008 |

* cited by examiner

*Primary Examiner* — Vibol Tan
(74) *Attorney, Agent, or Firm* — Bacon & Thomas, PLLC

(57) ABSTRACT

An illumination circuit includes a series circuit including light sources connected in series between a high voltage node and a low voltage node, and break-protecting circuits. Each break-protecting circuit includes a control circuit and a bypass circuit. The bypass circuit is connected in parallel to at least one corresponding light source of the light sources. The control circuit is connected to the series circuit and the bypass circuit to detect a voltage change of the series circuit and control the bypass circuit to be in a conduct state or a blocked state according to the voltage change

18 Claims, 5 Drawing Sheets

US 8,400,075 B2

ILLUMINATION CIRCUIT HAVING BYPASS CIRCUIT CONTROLLABLE ACCORDING TO VOLTAGE CHANGE OF SERIES CIRCUIT THEREOF

BACKGROUND

1. Technical Field

The present disclosure generally relates to illumination circuits, and particularly to an illumination circuit including a series of light emitting diodes (LEDs).

2. Description of Related Art

Light sources, such as LEDs, are commonly used to backlight liquid crystal displays (LCDs), because they have advantages of low power consumption, high light emitting efficiency, environmental protection, for example.

An LED backlight often utilizes a direct structure of a plurality of LEDs connected in series or in parallel. With serial connection of LEDs, wherein each LED is serially connected to the same illumination circuit, if one LED is damaged or broken, the entire illumination circuit is disabled and no backlight is available. Display of the LCD is, accordingly, deteriorated.

What is needed, therefore, is an illumination circuit which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will now be made to the drawings to describe various embodiments in detail.

Figure 1:
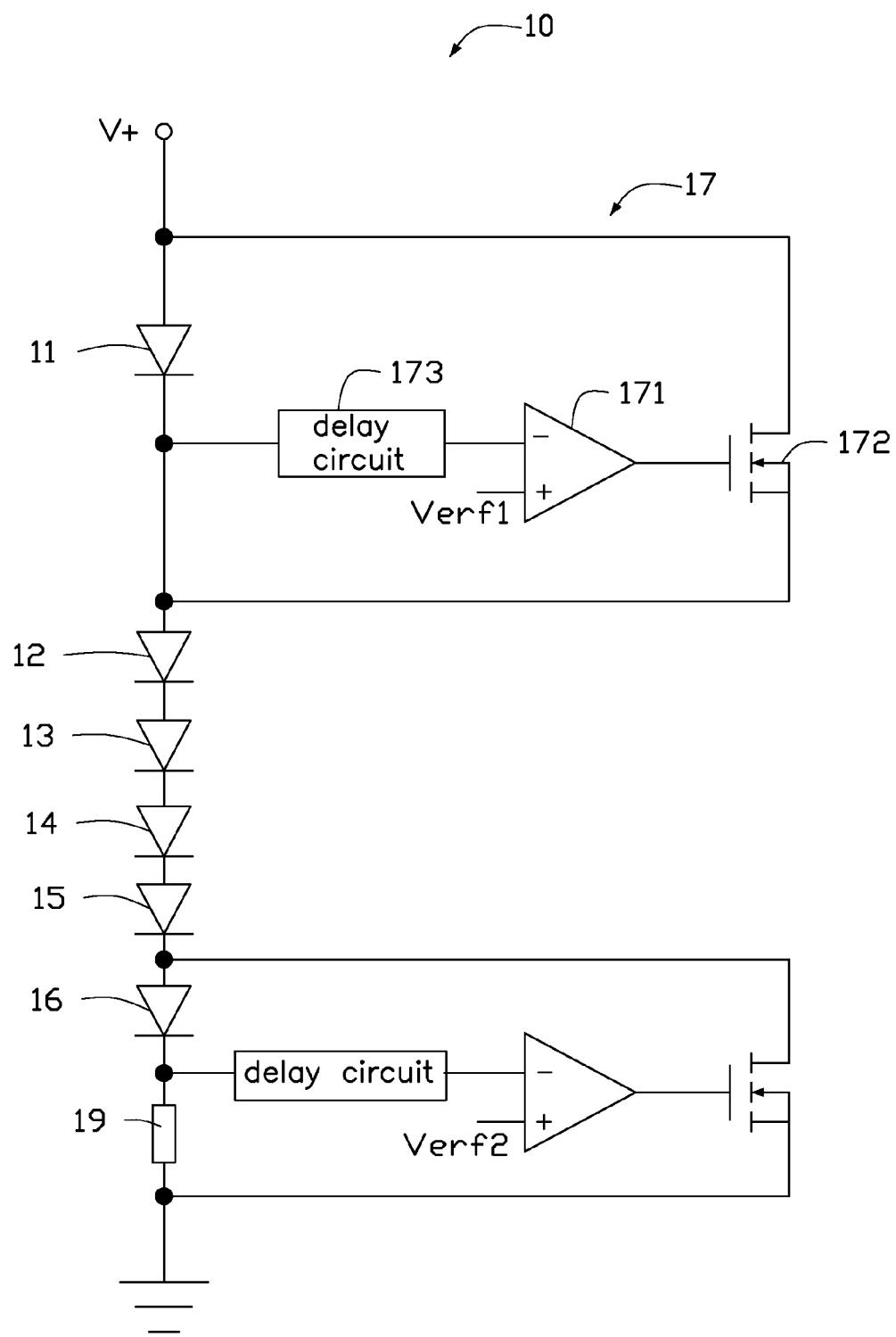
FIG. 1 is a schematic circuit diagram of a first embodiment of an illumination circuit.

Referring to FIG. 1, a schematic circuit diagram of a first embodiment of an illumination circuit 10 is shown. The illumination circuit 10 includes a series circuit (not labeled) including a plurality of light sources connected in series between a high voltage node V+and a low voltage node (not labeled), and a plurality of break-protecting circuits 17. The light sources may be LEDs 11-16 in FIG. 1, and the series circuit may act as a light source for a backlight in an LCD. The low voltage node may be ground. Each break-protecting circuit 17 includes a bypass circuit 172 and a control circuit 171. The bypass circuit 172 is connected in parallel to at least one corresponding light source, for example, the LED 11. The control circuit 171 includes a first input (not labeled), a second input (not labeled), and an output (not labeled). The first input is connected to the series circuit, and the second input is connected to a constant reference voltage source, for example, the constant reference voltage source Verf1 or Verf2 in FIG. 1, to receive a constant reference voltage. The output is connected to the bypass circuit 172. The control circuit 171 compares two voltages on the first and the second inputs to determine whether the series circuit malfunctions, and directs the bypass circuit 172 into a blocked state or a conduct state accordingly.

The bypass circuit 17 can be connected in parallel to one or more light sources. Due to the one or more light sources connected in parallel to the bypass circuit 17 are part of the series circuit, define one terminal of the one or more light sources connected to the other part of the series circuit nearest to the high voltage node V+as a top terminal of the one or more light sources, and define the other terminal the one or more light sources connected to the other part of the series circuit nearest to the low voltage node as a bottom terminal of the one or more light sources. The top terminal may be connected to the high voltage node V+when the one or more light sources include a first light source, such as the LED 11 in FIG. 1, thus, the top terminal is an anode of the LED 11. The bottom terminal may be connected to the low voltage node when the one or more light sources include a last light source, such as the LED 16 in FIG. 1, thus, the bottom terminal is a cathode of the LED 16. Thus, the first input of the corresponding control circuit 17 can be connected to the bottom terminal of the one or more light sources, and the second input is connected to a constant reference voltage source to receive a constant reference voltage. The constant reference voltage exceeds that of the low voltage node, and is less than a voltage on the bottom terminal of the one or more light sources when the series circuit operates in a normal state.

The bypass circuit 172 may be a transistor, such as an N-Metal-Oxide-Semiconductor (NMOS) transistor. For example, when the bypass circuit 172 is connected in parallel to the LED 11, that is, a drain electrode of the bypass circuit 172 is connected to an anode of the LED 11, and a source electrode is connected to a cathode of the LED 11, when a high voltage is provided to a gate electrode of the bypass circuit 172, the bypass circuit 172 is switched on and into the conduct state.

When a low voltage is provided on the gate electrode, the bypass circuit 172 is switched off and into the blocked state.

The control circuit 171 may be an operational amplifier including an inverting terminal as the first input and a non-inverting terminal as the second input. The first input is connected to the cathode of the LED 11, and the second input is connected to a first constant reference voltage source Verf 1 receiving a first constant reference voltage. In this embodiment, the LEDs 11-16 are connected in series between the high voltage note V+and the ground. Thus, the first constant reference voltage exceeds that of the ground, and is less than a voltage on the cathode of the LED 11 when the series circuit operates in the normal state.

When the series circuit operates in the normal state, current through the LEDs 11-16 causes the LEDs 11-16 to emit light. At this time, due to the first constant reference voltage being less than that on the cathode of the LED 11, a voltage on the first input exceeds that on the second input, and the output generates a low level voltage to the gate electrode of the bypass circuit 172. Thus, the bypass circuit 172 is in the blocked state.

When the LED 11 malfunctions, the series circuit is accordingly broken, and no current flows through the LEDs 11-16. The first input is connected to the ground via the LEDs 12-16. Due to the first constant reference voltage exceeding that of the ground, the voltage on the first input is less than that on the second terminal, and then the output generates a high level voltage to the gate electrode of the bypass circuit 172. Thus, the bypass circuit 172 is in the conduct state, and current through the LEDs 12-16 via the bypass circuit 172 restarts light emission. Thus, even if LED 11 fails, due to the break-protecting circuit 17, other LEDs 12-16 continue to emit light, and the function of the illumination circuit 10 is unaffected.

In one example, the bypass circuit 172 of the break-protecting circuit 17 can be connected in parallel to more LEDs to keep the series circuit in the normal state when the LEDs are broken. In this case, the bypass circuit 172 is connected in parallel to the LEDs, that is, the drain electrode of the bypass circuit 172 is connected to an anode of a first LED of the LEDs nearest to the high voltage note V+, and the source electrode is connected to a cathode of a last LED of the LEDs nearest to the ground. The first input of the control circuit 171 is connected to the cathode of the last LED of the LEDs, and the second input is connected to the constant reference voltage source to receive a constant reference voltage. The constant reference voltage exceeds that of the ground, and is less than a voltage on the cathode of the last of the LEDs when the series circuit operates in the normal state.

In addition, when the bypass circuit 172 is connected in parallel to one or more LEDs including the last LED 16 of all the LEDs, a cathode thereof is grounded. That is, whether the last LED 16 is normal or broken, the voltage on the cathode of the LED 16 remains constant. Thus, the comparison result by the control circuit 171 shows the voltage on the first input less than that on the second input, and the output of the control circuit 171 always outputs the high level voltage to the gate electrode of the bypass circuit 172. Thus, the bypass circuit 172 is always in the conduct state. Therefore, a resistor needs to be connected between the cathode of the LED 16 and the ground to provide voltage higher than that of the ground to the first input of the control circuit 171 when the series circuit operates in the normal state.

Referring to FIG. 1 again, for example, if the bypass circuit 172 of another break-protecting circuit 17 is connected in parallel to the last LED 16 and the resistor 19, the first input of the control circuit 171 is connected between the cathode of the LED 16 and the resistor 19, and the second input is connected to a second constant reference voltage source Verf 2 to receive a second constant reference voltage. The second constant reference voltage exceeds that of the ground, and is less than that on the cathode of the LED 16 when the series circuit operates in the normal state. Thus, when series circuit operates in the normal state, current through the LEDs 11-16, due to the second constant reference voltage being less than the voltage on the cathode of the LED 16, a voltage on the first input exceeds that on the second input, and the output generates a low level voltage to the gate electrode of the bypass circuit 172. Thus, the bypass circuit 172 is in the blocked state.

When the LED 16 malfunctions, the first input is connected to the ground via the resistor 19. Due to the second constant reference voltage exceeding the voltage of the ground, the voltage on the first input is less than that on the second input, and the output generates a high level voltage to the gate electrode of the bypass circuit 172. Thus, the bypass circuit 172 is in the conduct state, and current through the LEDs 11-15 causes light to be emitted again.

Furthermore, a delay circuit 173 may be connected between the first input of the control circuit 171 and the series circuit to prevent the break-protecting circuit 17 from incorrectly operating when the illumination circuit 10 is powered on. In alternative embodiments, the delay circuit can be connected between the drain electrode of the bypass circuit 172 and the series circuit. Moreover, a constant current source can be connected in series to the series circuit to maintain constant current through the series circuit.

Figure 2:
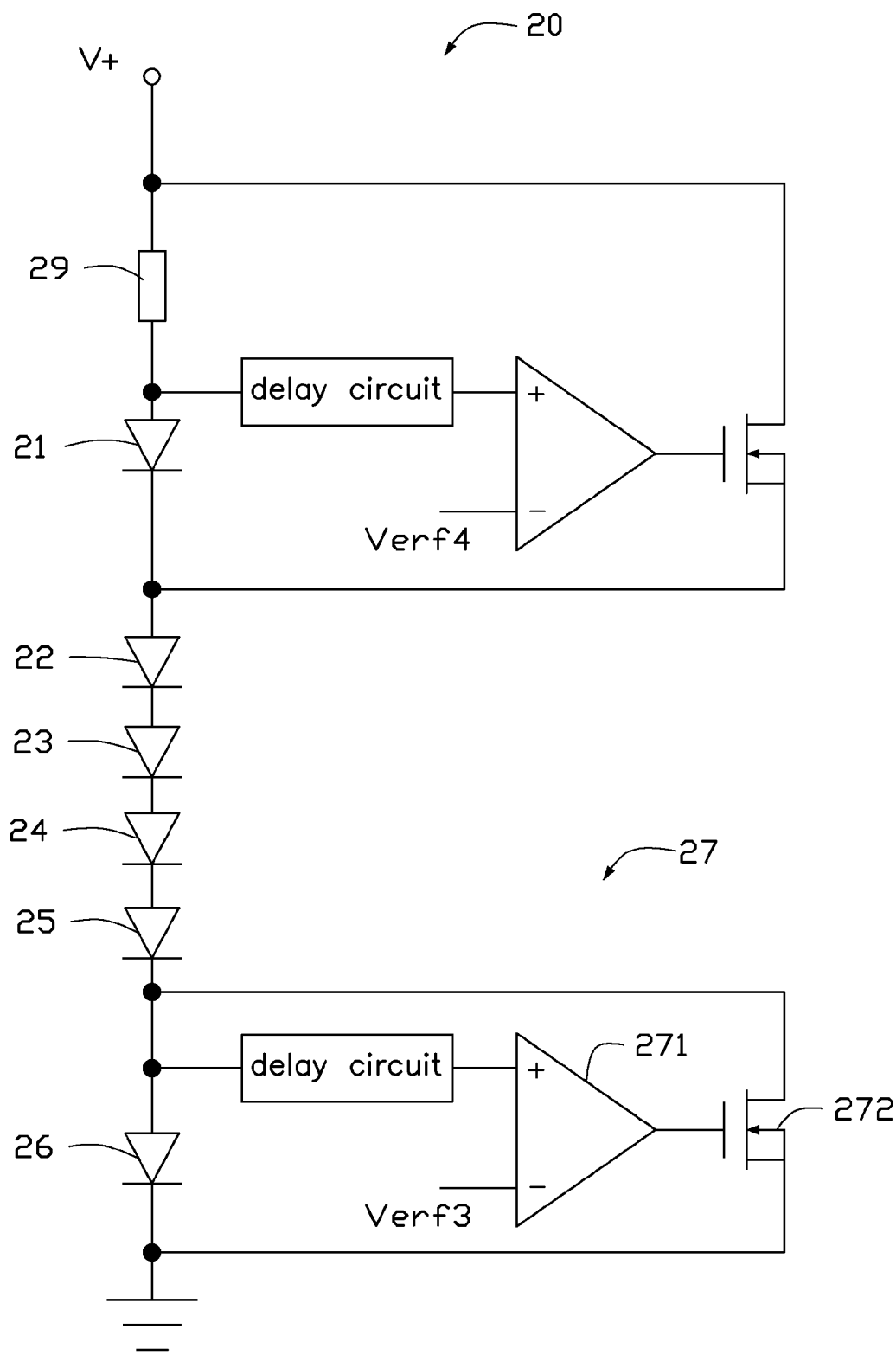
FIG. 2 is a schematic circuit diagram of a second embodiment of an illumination circuit.

Referring to FIG. 2, a schematic circuit diagram of a second embodiment of an illumination circuit 20 is shown. The illumination circuit 20 differs from the illumination circuit 10 of the first embodiment in that when a bypass circuit 272 of a break-protecting circuit 27 is connected in parallel to one or more light sources, the second input of a corresponding control circuit is connected to a top terminal of the one or more light sources, and the first input is connected to a constant reference voltage source to receive a constant reference voltage. The constant reference voltage exceeds that on the top terminal of the light sources when the series circuit operates in the normal state, and is less than a voltage of the high voltage node V+.

In this embodiment, when the bypass circuit 272 of one break-protecting circuit 27 is connected in parallel to an LED 26. The second input of the corresponding control circuit 271 is connected to an anode of the LED 26, and the first input is connected to a constant reference voltage source Verf 3 to receive a constant reference voltage. Thus, the constant reference voltage exceeds that on the anode of the LED 26 when the series circuit operates in the normal state, and is less than the voltage of high voltage node V+. When the series circuit operates in the normal state, current flows through the LEDs 21-26, and the LEDs 21-26 emit light. At this time, due to the constant reference voltage exceeding that on the anode of the LED 26, when the control circuit 271 is an operational amplifier including an inverting terminal as the first input and a non-inverting terminal as the second input, a voltage on the first input exceeds that on the second input, and then the output generates a low level voltage to a gate electrode of the bypass circuit 272. Thus, the bypass circuit 272 is in a blocked state.

When the LED 26 malfunctions, the series circuit composed by the LEDs 21-26 is accordingly broken, and no current flows through the LEDs 21-26. Then, the second input is connected to the high voltage node V+via the LEDs 21-25. Due to the constant reference voltage less than the voltage of the high voltage node V+, the voltage on the first input is less than that on the second input, and then the output generates a high level voltage to the gate electrode of the bypass circuit 272. Thus, the bypass circuit 272 is in a conduct state, and the current flows through the LEDs 21-25 via the bypass circuit 272. The LEDs 21-25 can emit light again.

For the first LED 21 of all the LEDs 21-26 connected in series, an anode thereof is connected to the high voltage node V+. That is, whether the LED 21 is in a normal state or broken, the voltage on the anode of the LED 21 keeps constant. Thus, when the break-protecting circuit 27 is connected in parallel to one or more LEDs including the LED 21, a resistor needs to be connected between the anode of the LED 21 and the high voltage note V+for providing a voltage less than the voltage of the high voltage node V+to the second input of the control circuit 271 when the series circuit operates in the normal state.

Referring to FIG. 2 again, the bypass circuit 272 of another break-protecting circuit 27 is connected in parallel to the LED 21 and the resistor 29. The second input of the control input 271 is connected between the anode of the LED 21 and the resistor 29, and the first input is connected to a constant reference voltage source Verf 4 to receive a constant reference voltage. The constant reference voltage exceeds that on the anode of the LED 21 when the series circuit operates in the normal state, and is less than the voltage of the high voltage node V+. The operation is same as that described above.

Figure 3:
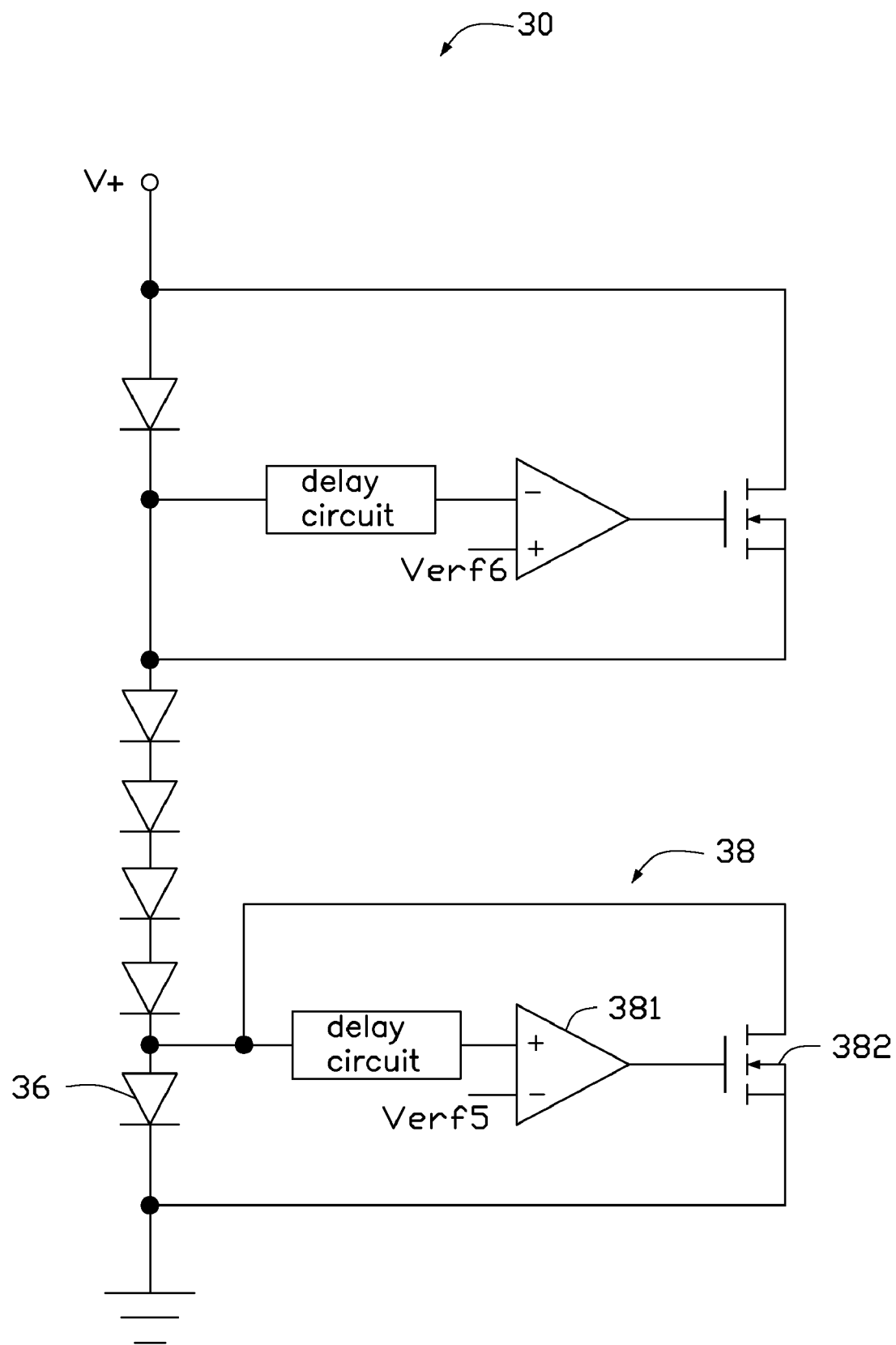
FIG. 3 is a schematic circuit diagram of a third embodiment of an illumination circuit.

Referring to FIG. 3, a schematic circuit diagram of a third embodiment of an illumination circuit 30 is shown. The illumination circuit 30 is similar to the illumination circuit 10 of the first embodiment. However, a break-protecting circuit 38, a bypass circuit 382 thereof is connected in parallel to one or more LEDs including a last LED 36 nearest to the ground, is different from the break-protecting circuit 17. That is, the second input terminal of a corresponding control circuit 381 is connected to an anode of the last LED 36, and the first input is connected to a constant reference voltage source Verf 5 to receive a constant reference voltage. The constant reference voltage exceeds that on the anode of the last LED 36 when the series circuit operates in a normal state, and is less than a voltage of the high voltage node V+. Thus, a resistor or the same can be omitted.

Figure 4:
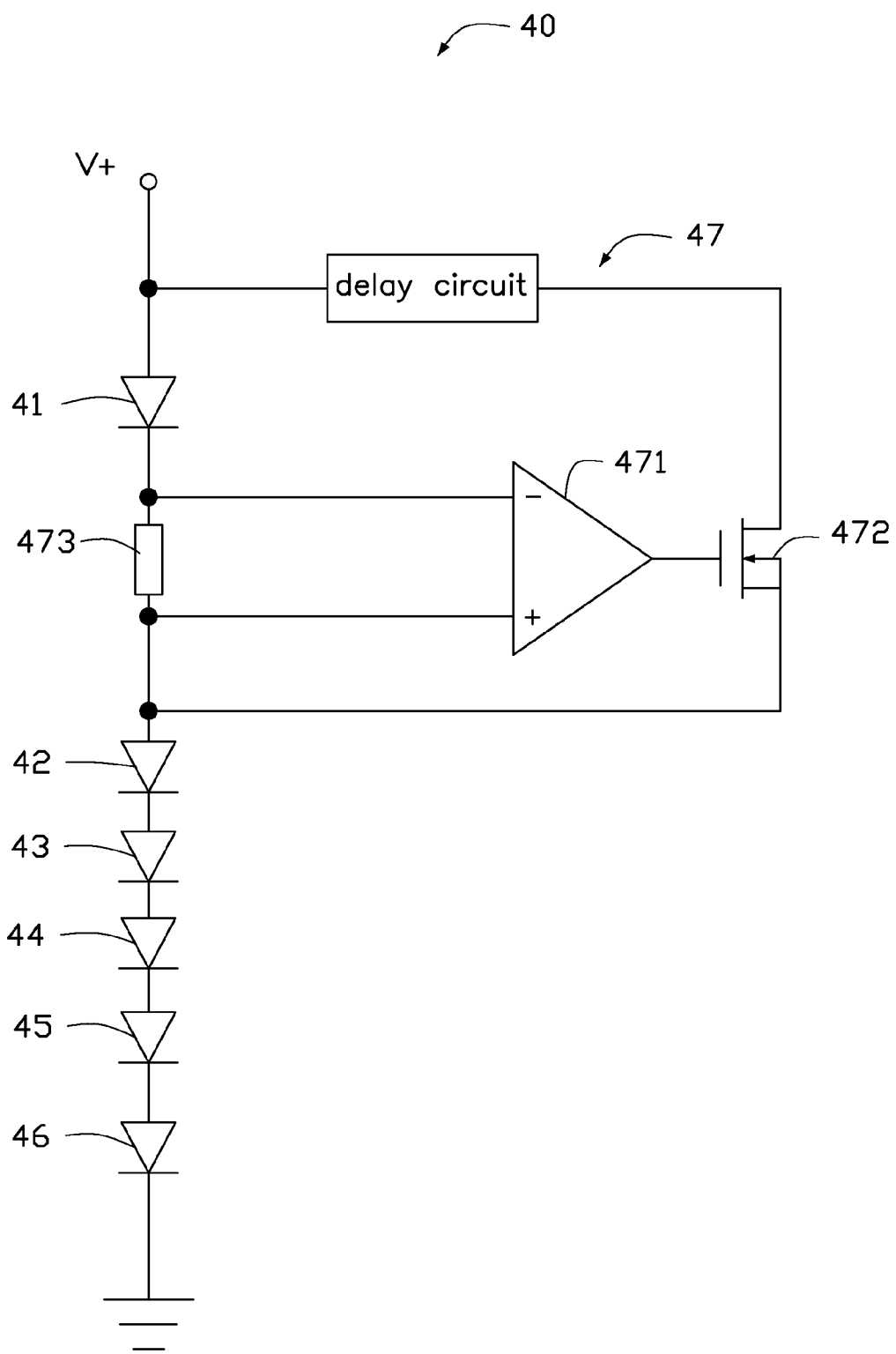
FIG. 4 is a schematic circuit diagram of a fourth embodiment of an illumination circuit.

Referring to FIG. 4, a schematic circuit diagram of a fourth embodiment of an illumination circuit 40 is shown. The illumination circuit 40 is similar to the illumination circuit 10 of the first embodiment. However, when a bypass circuit 472 of a break-protecting circuit 47 is connected in parallel to one or more light sources, a resistor is connected in series between a bottom terminal of the light sources and other part of the series circuit. Then the first input of a corresponding control circuit 471 is connected between the bottom terminal of the light sources and a terminal of the resistor, and the second input is connected to the other terminal of the resistor.

In this embodiment, a resistor 473 is connected between an LED 41 and a subsequent LED 42. The bypass circuit 472 of the break-protecting circuit 47 is connected in parallel to the LED 41 and the resistor 473, the first input of the control circuit 471 is connected between the cathode of the LED 41 and the resistor 473, and the second input is connected between the resistor 473 and the next LED 42.

When the series circuit operates in the normal state, current flows through the LEDs 41-46. At this time, due to different voltages on two terminals of the resistor 473, when the control circuit 471 is an operational amplifier including an inverting terminal as the first input and a non-inverting terminal as the second input, a voltage on the first input exceeds that on the second input, and the output generates a low level voltage to a gate electrode of the bypass circuit 472. Thus, the bypass circuit 472 is in a blocked state.

When the LED 41 malfunctions, the series circuit is accordingly broken, and no current flows through the LEDs 41-46. The voltages on the first and the second inputs are pulled down to equal a voltage of the ground and the output generates a critical voltage to the gate electrode of the bypass circuit 472. Due to a drain electrode of the bypass circuit 472 being pulled equal to a voltage of high voltage node V+, the bypass circuit 472 is switched on and in a conduct state, and the current flows through the LEDs 42-46 via the bypass circuit 472 to make the LEDs 42-46 emit light again.

When the bypass circuit 472 of the break-protecting circuit 47 is connected in parallel to more LEDs, the resistor is connected between a cathode of a last LED of the LEDs nearest to the ground and a subsequent LED. If the last LED of the LEDs is a last LED 46 of all the LEDs 41-46 connected in series, the resistor is connected between the cathode of the last LED 46 and the ground.

Figure 5:
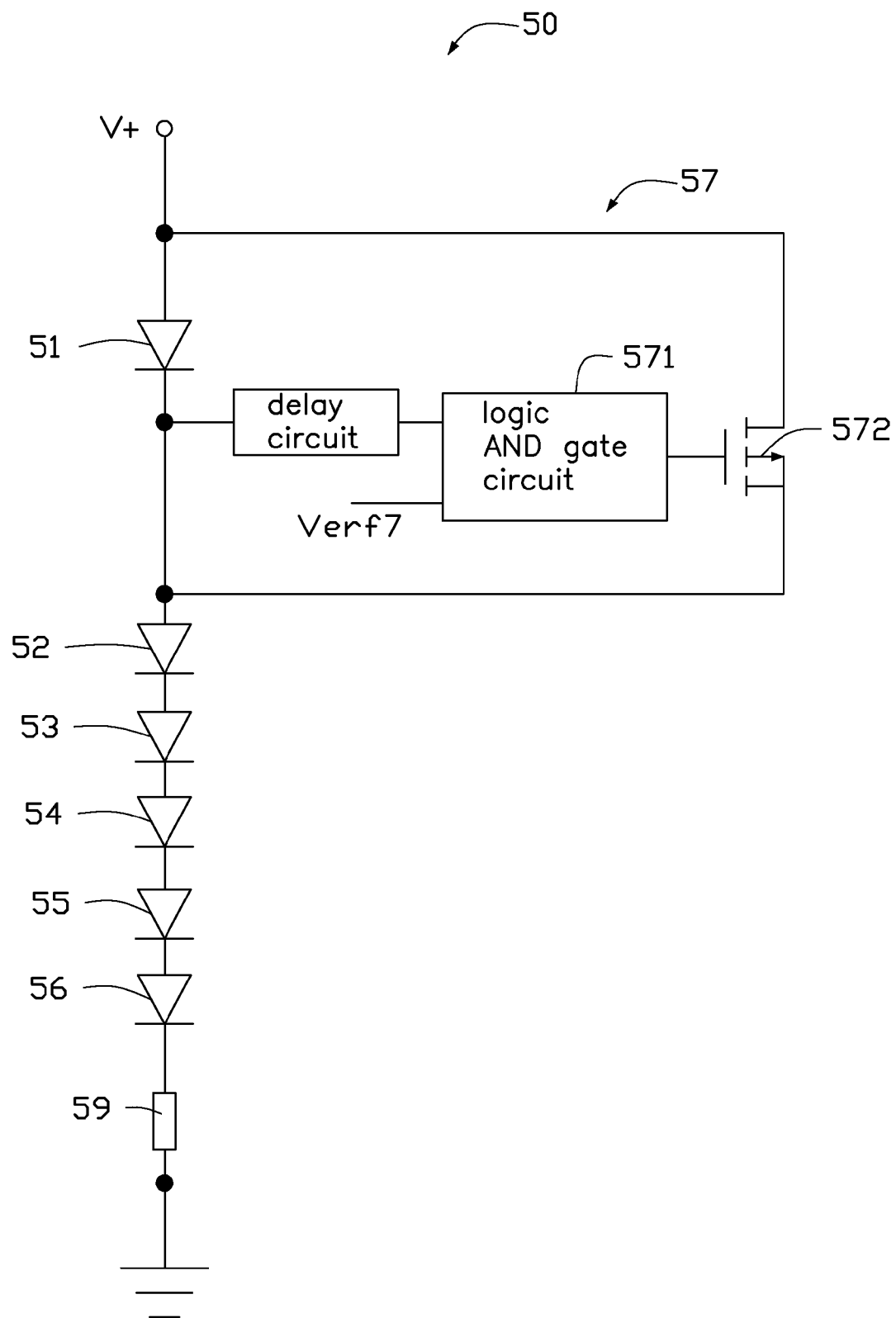
FIG. 5 is a schematic circuit diagram of a fifth embodiment of an illumination circuit.

Referring to FIG. 5, a schematic circuit diagram of a fifth embodiment of an illumination circuit 50 is shown. The illumination circuit 50 is similar to the illumination circuit 10, but the control circuit 571 of a break-protecting circuit 57 is a logic AND gate circuit, and the bypass circuit 572 of the break-protecting circuit 57 is a transistor, such as a P-Metal-Oxide-Semiconductor (PMOS) transistor. For example, when the bypass circuit 572 is connected in parallel to an LED 51, the first input of the control circuit 571 is connected to a cathode of the LED 51, and the second input is connected to a constant reference voltage source Ref 7 for receive a high level voltage.

When the series circuit operates in the normal state, current flows through LEDs 51-56. At this time, a voltage of the cathode of the LED 51 provided to the first input is a high level voltage, due to the voltage of the second input also being a high level voltage, and then the output generates a high level voltage to a gate electrode of the bypass circuit 572. Thus, the bypass circuit 572 is in a blocked state.

When the LED 51 malfunctions, the series circuit is accordingly broken, and no current flows through the LEDs 51-56. Then the voltage on the first input is pulled down to equal a voltage of the ground, and the voltage of the second input remains a high level voltage. Thus, the output generates a low level voltage to the gate electrode of the bypass circuit 572 to make the bypass circuit 572 in a conduct state. The current flows through the LEDs 52-56 via the bypass circuit 572 to make the LEDs 52-56 emit light again.

As in the first embodiment, when the transistor 572 of another break-protecting circuit 57 is connected in parallel to one or more LEDs including a last LED 56 connected to the ground, a resistor 59 needs to be connected between the last LED 56 and the ground to provide a high level voltage to the first input of the corresponding control circuit 571 when the series circuit operates in the normal state.

It is believed that the present embodiments and their advantages will be understood from the foregoing description, and it will be apparent that various changes may be made thereto without departing from the spirit and scope of the embodiments or sacrificing all of their material advantages.

What is claimed is:

1. An illumination circuit, comprising:
a series circuit comprising a plurality of light sources connected in series between a high voltage node and a low voltage node; and
a plurality of break-protecting circuits;
wherein each break-protecting circuit comprises a control circuit and a bypass circuit, the bypass circuit connected in parallel to at least one corresponding light source of the plurality of light sources, and the control circuit connected to the series circuit, the bypass circuit to detect a voltage change of the series circuit and control the bypass circuit to be in a conduct state or a blocked state according to the voltage change;
wherein, one terminal of the bypass circuit is connected to a top terminal of the at least one corresponding light source nearest to the high voltage node, and the other terminal of the bypass circuit is connected to a bottom terminal of the at least one corresponding light source nearest to the low voltage node; and
wherein the control circuit comprises a first input, a second input, and an output, the first input connected to the bottom terminal of the at least one corresponding light source, the second input connected to a constant reference voltage source to receive a constant reference voltage, the constant reference voltage exceeding that of the low voltage node, and less than a voltage on the bottom terminal of the at least one corresponding light source when the series circuit operates in a normal state, when a voltage on the first input exceeds that of the constant reference voltage, the control circuit outputs a control signal via the output to control the bypass circuit in a blocked state, and when the voltage on the first input is less than the constant reference voltage, the control circuit outputs a control signal via the output to control the bypass circuit in a conduct state.

2. The illumination circuit of claim 1, further comprising a resister connected between a last light source of the plurality of light sources nearest to the low voltage node and the low voltage node, wherein when the at least one light source comprises the last light source, the resistor is connected between the bottom terminal of the at least one corresponding light source and the bypass circuit.

3. The illumination circuit of claim 2, wherein the bypass circuit is an N-Metal-Oxide-Semiconductor (NMOS) transistor, and the control circuit is an operational amplifier, the operational amplifier comprising an inverting terminal as the first input and a non-inverting terminal as the second input.

4. The illumination circuit of claim 1, further comprising another break-protecting circuit, wherein the another break-protecting circuit comprises another bypass circuit and another control circuit, the another bypass circuit connected in parallel to the at least one light source comprising a last light source of the plurality of light sources nearest to the low voltage node, the another control circuit comprising a third and a fourth inputs and an output, the third input connected to the top terminal of the at least one light source, the fourth input connected to another constant reference voltage source to receive another constant reference voltage, the another constant reference voltage exceeding that on the top terminal of the at least one corresponding light source when the series circuit operates in the normal state, and less than a voltage of the high voltage node.

5. The illumination circuit of claim 4, wherein the another bypass circuit is an N-Metal-Oxide-Semiconductor (NMOS) transistor, and the another control circuit is an operational amplifier, the operational amplifier comprising a non-inverting terminal as the third input and an inverting terminal as the fourth input.

6. The illumination circuit of claim 1, further comprising a resister connected between the bottom terminal of the at least one corresponding light source and the bypass circuit, wherein the control circuit comprises a first input, a second input, and an output, the first input connected between the bottom terminal of the at least one corresponding light source and one terminal of the resistor, the second input connected to the other terminal of the resistor.

7. The illumination circuit of claim 6, wherein the bypass circuit is an N-Metal-Oxide-Semiconductor (NMOS) transistor, and the control circuit is an operational amplifier, the operational amplifier comprising a inverting terminal as the first input and an non-inverting terminal as the second input.

8. The illumination circuit of claim 1, wherein the break-protecting circuit further comprises a delay circuit connected between the series circuit and the control circuit.

9. The illumination circuit of claim 1, wherein the break-protecting circuit further comprises a delay circuit connected between the top terminal of the at least one corresponding light source and the bypass circuit.

10. An illumination circuit, comprising:
a series circuit comprising a plurality of LEDs connected in series between a high voltage node and a low voltage node, an anode of a first LED of the plurality of LEDs connected to the high voltage node, and a cathode of a last LED of the plurality of LEDs connected to the low voltage node; and
at least one break-protecting circuit;
wherein each break-protecting circuit comprises a control circuit and a bypass circuit, the bypass circuit connected in parallel to at least one LED of the plurality of LEDs, the control circuit comprising a first input, a second input, and an output, the first input connected to the series circuit, the second input connected to a constant reference voltage source to receive a constant reference voltage, and the output connected to the bypass circuit, and the control circuit compares two voltages of the first and the second input to determine whether the series circuit malfunctions and controls the bypass circuit in a blocked state or a conduct state according to a comparison result.

11. The illumination circuit of claim 10, wherein the first input is connected to a cathode of a last LED of the at least one LED nearest to the low voltage node, the constant reference voltage exceeds that of the low voltage node and is less than a voltage on the cathode of the last LED of the at least one LED when the series circuit operates in a normal state.

12. The illumination circuit of claim 11, wherein the control circuit is an operational amplifier, the operational amplifier comprising an inverting terminal as the first input and a non-inverting terminal as the second input, and the bypass circuit is an N-Metal-Oxide-Semiconductor transistor, a drain electrode of the transistor connected to an anode of a first LED of the at least one LED, a source electrode of the transistor connected to the cathode of the last LED of the at least one LED.

13. The illumination circuit of claim 11, wherein the control circuit is a logic AND gate circuit, and the bypass circuit is a P-Metal-Oxide-Semiconductor transistor, a drain electrode of the transistor connected to an anode of a first LED of the at least one LED, a source electrode of the transistor connected to the cathode of the last LED of the at least one LED.

14. The illumination circuit of claim 10, wherein the control circuit is an operational amplifier, the operational amplifier comprising a non-inverting terminal as the first input connected to an anode of a first LED of the at least one LED nearest to the high voltage source, and an inverting terminal as the second input, the constant reference voltage exceeding that on the anode of a first LED of the at least one LED and less than a voltage of the high voltage source, and the bypass circuit is an N-Metal-Oxide-Semiconductor transistor, a drain electrode of the transistor connected to an anode of a first LED of the at least one LED, a source electrode of the transistor connected to the cathode of the last LED of the at least one LED.

15. An illumination circuit, comprising:
a series circuit comprising a plurality of light sources connected in series between a high voltage node and a low voltage node; and
a plurality of break-protecting circuits;
wherein each break-protecting circuit comprises a control circuit and a bypass circuit, the bypass circuit connected in parallel to at least one corresponding light source of the plurality of light sources, and the control circuit connected to the series circuit, the bypass circuit to detect a voltage change of the series circuit and control the bypass circuit to be in a conduct state or a blocked state according to the voltage change;
wherein one terminal of the bypass circuit is connected to a top terminal of the at least one corresponding light source nearest to the high voltage node, and the other terminal of the bypass circuit is connected to a bottom terminal of the at least one corresponding light source nearest to the low voltage node; and
the control circuit comprises a first input, a second input, and an output, the second input connected to the top terminal of the at least one corresponding light source, the first input connected to a constant reference voltage source to receive a constant reference voltage, the constant reference voltage exceeding that on the top terminal of the at least one corresponding light source when the series circuit operates in a normal state, and less than a voltage of the high voltage node, when a voltage on the second input is less than the constant reference voltage, the control circuit outputs a control signal via the output to control the bypass circuit in a blocked state, and when the voltage on the second input exceeds that the constant reference voltage, the control circuit outputs a control signal via the output to control the bypass circuit in a conduct state.

16. The illumination circuit of claim 15, further comprising a resistor connected between a first light source of the plurality of light sources nearest to the high voltage node and the high voltage node, wherein when the at least one light source comprises the first light source, the resistor is connected between the top terminal of the at least one corresponding light source and the bypass circuit.

17. The illumination circuit of claim 16, wherein the bypass circuit is an N-Metal-Oxide-Semiconductor (NMOS) transistor, and the control circuit is an operational amplifier, the operational amplifier comprising a non-inverting terminal as the second input and an inverting terminal as the first input.

18. An illumination circuit, comprising:
   a series circuit comprising a plurality of light sources connected in series between a high voltage node and a low voltage node; and
   a plurality of break-protecting circuits;
   wherein each break-protecting circuit comprises a control circuit and a bypass circuit, the bypass circuit connected in parallel to at least one corresponding light source of the plurality of light sources, and the control circuit connected to the series circuit, the bypass circuit to detect a voltage change of the series circuit and control the bypass circuit to be in a conduct state or a blocked state according to the voltage change, one terminal of the bypass circuit is connected to a top terminal of the at least one corresponding light source nearest to the high voltage node, and the other terminal of the bypass circuit is connected to a bottom terminal of the at least one corresponding light source nearest to the low voltage node; and
   the control circuit is a logic AND gate circuit comprising a first input, a second input, and an output, the first input connected to the bottom terminal of the at least one corresponding light source, the second input connected to a constant reference voltage source to receive a high level voltage, and the bypass circuit is a P-Metal-OxideSemiconductor (PMOS) transistor, a drain electrode connected to the top terminal of the at least one corresponding light source, and a source electrode connected to the bottom terminal of the at least one corresponding light source.

* * * * *